United States Patent [19]
Dam

[11] Patent Number: 5,702,246
[45] Date of Patent: Dec. 30, 1997

[54] SHAFT FURNACE FOR DIRECT REDUCTION OF OXIDES

[75] Inventor: Oscar G. Dam, Puerto Ordaz, Venezuela

[73] Assignee: Xera Technologies Ltd., Grand Cayman, Cayman Islands

[21] Appl. No.: 603,922

[22] Filed: Feb. 22, 1996

[51] Int. Cl.[6] ................................................ F27D 1/08
[52] U.S. Cl. ..................... 432/95; 432/96; 432/99; 432/102
[58] Field of Search ........................ 432/95, 96, 97, 432/99, 100, 101, 102

[56] References Cited

U.S. PATENT DOCUMENTS

| | | | |
|---|---|---|---|
| 3,260,514 | 7/1966 | Asano et al. | 432/99 |
| 3,955,915 | 5/1976 | Buchner | 432/96 |
| 3,957,422 | 5/1976 | Kohn | 432/96 |
| 4,031,183 | 6/1977 | Rourke | 432/96 |
| 4,178,151 | 12/1979 | Huestis | 432/95 |
| 4,747,773 | 5/1988 | Predescu et al. | 432/95 |
| 4,805,881 | 2/1989 | Schultz et al. | 432/152 |
| 5,118,288 | 6/1992 | Litka et al. | 432/102 |
| 5,423,676 | 6/1995 | Tsunemi et al. | 432/95 |
| 5,460,517 | 10/1995 | Scheibenreif et al. | 432/95 |

Primary Examiner—Henry A. Bennett
Assistant Examiner—Jiping Lu
Attorney, Agent, or Firm—Bachman & LaPointe, P.C.

[57] ABSTRACT

A shaft furnace for reduction of oxides includes a shaft member having an oxide inlet and defining a pre-heating and pre-reducing zone downstream of the oxide inlet, a reducing zone downstream of the pre-heating and pre-reducing zone a transition zone downstream of the reducing zone, and a discharge zone downstream of the transition zone; and a gas reforming zone associated with the shaft member for reforming a methane-containing gas into a reformed gas and for introducing the reformed gas into the reducing zone whereby oxides in the reducing zone are reduced by the reformed gas.

14 Claims, 2 Drawing Sheets

SHAFT FURNACE FOR DIRECT REDUCTION OF OXIDES

BACKGROUND OF THE INVENTION

The invention relates to an improved shaft furnace for the direct reduction of oxides, especially iron oxides.

Conventionally, shaft furnaces are used to treat metal oxides such as iron oxides at elevated temperatures with a reduction material such as reducing gas, rich in hydrogen and carbon monoxide, so as to reduce the oxides and thereby produce a metallized product such as reduced iron at a discharge outlet of the shaft furnace.

Typically, the reducing gas to be introduced into the shaft furnace is produced in an external reactor known as a reformer where methane and other natural gases are reformed into reducing gases rich in hydrogen and carbon monoxide for use in treating oxides in the shaft furnace. Other conventional shaft furnaces involve the creation of reducing gases in the actual reaction or reducing zone of the furnace.

A need remains for a shaft furnace for direct reduction of oxides which does not require additional external reformer equipment or reactors, and which reduces the energy consumption required using inefficient reformers or reformation reactions.

It is therefore the primary object of the present invention to provide a shaft furnace for direct reduction of oxides which includes a reforming zone for reforming methane and/or natural gases into reducing gases to be introduced to the oxide reduction zone.

It is a further object of the present invention to provide a shaft furnace wherein the gas reforming zone is intimately associated with the reducing zone of the shaft furnace whereby a portion of heat requirements for the reformation reaction can be drawn from the shaft furnace, and reformed gas can be fed directly to the reduction zone, in an efficient manner.

It is a still further object of the present invention to provide a shaft furnace having enhanced ability to cool reduced oxides in a transition zone.

Other objects and advantages of the present invention will appear hereinbelow.

SUMMARY OF THE INVENTION

In accordance with the invention, the foregoing objects and advantages are readily attained.

According to the invention, a shaft furnace is provided for the direct reduction of oxides, which comprises shaft means having an oxide inlet and defining a pre-heating and pre-reducing zone downstream of said oxide inlet, a reducing zone downstream of said pre-heating and pre-reducing zone, a transition zone downstream of said reducing zone, and a discharge zone downstream of said transition zone, and gas reforming means associated with said shaft means for reforming a methane-containing gas into a reformed gas and for introducing said reformed gas into said reducing zone whereby oxides in said reducing zone are reduced by said reformed gas.

Still further in accordance with the invention, the shaft furnace preferably includes a gas reforming zone communicated with said reducing zone, and means for introducing a methane-containing gas into said gas reforming zone whereby said methane-containing gas is reformed into a reducing gas and said reducing gas is introduced into said reducing zone.

According to the invention, a method for direct reduction of oxides is also provided which comprises the steps of providing a shaft furnace having an oxide inlet, a pre-heating and pre-reducing zone downstream of said oxide inlet, a reducing zone downstream of said pre-heating and pre-reducing zone, a transition zone downstream of said reduction zone, a discharge zone downstream of said transition zone, and a gas reforming zone associated with said reducing zone; feeding oxides to said oxide inlet so that said oxides flow downstream through said shaft furnace to said discharge zone; feeding a methane-containing gas to said gas reforming zone so as to reform said methane-containing gas into a reducing gas which flows into said reducing zone; maintaining a temperature in said pre-heating and pre-reducing zone at between about ambient to about 760° C.; and maintaining a temperature in said reducing zone of between about 760° C. to about 960° C. whereby said oxides are reduced in said reducing zone so as to provide a reduced metallized product at said discharge zone.

BRIEF DESCRIPTION OF THE DRAWINGS

A detailed description of preferred embodiments of the invention follows, with reference to the attached drawings wherein.

DETAILED DESCRIPTION

Figure 1:
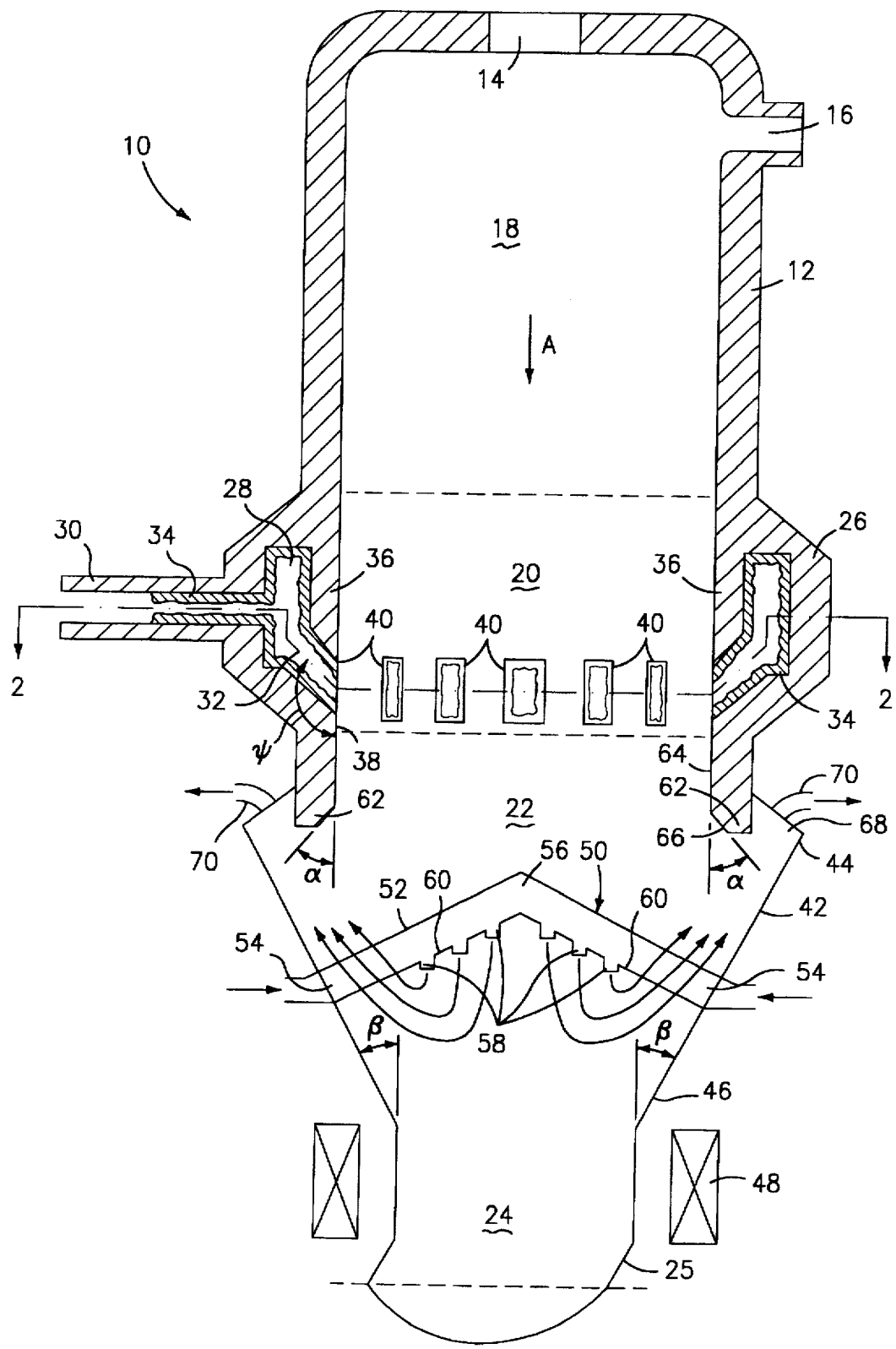
FIG. 1 is a vertical sectional view of a shaft furnace according to the present invention.

The invention relates to a shaft furnace for the direct reduction of oxides, especially iron oxides, which includes a gas reformation chamber or zone for reforming gas into reformed or reducing gas which advantageously avoids the need for additional separate reformers and the like, and which also provides an efficient and effective production of reducing gas thereby enhancing the overall direct reduction process.

Referring now to the attached drawings, a detailed description of a preferred embodiment of the shaft furnace of the present invention, generally referred to in the drawings by reference numeral 10, will be provided.

Figure 2:
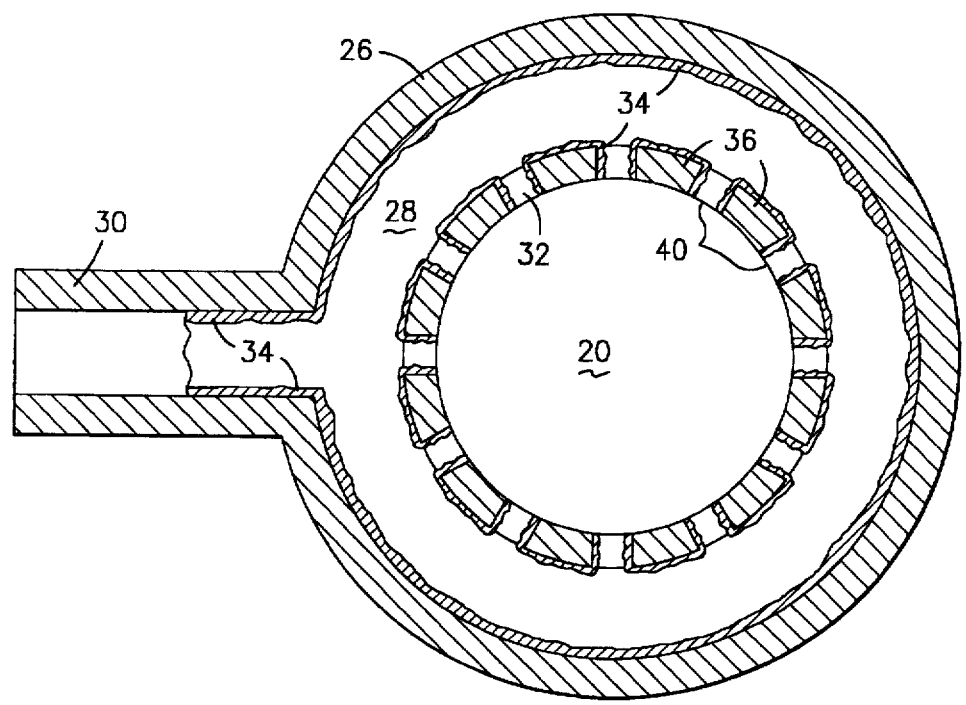
FIG. 2 is a horizontal cross-section taken along the lines 2—2 of FIG. 1.

Referring to FIGS. 1 and 2, a shaft furnace 10 according to the invention is illustrated. Shaft furnace 10 preferably includes a substantially cylindrical shaft member 12 having an inlet 14 for receiving oxides and a gas exhaust outlet 16, a substantially conical-shaped member 42 and a bottom structure 25 each of which is further described below. Shaft 12 and to some extent member 42 and structure 25 define several interior zones in which various stages of treatment of oxides take place during the direct reduction process. In the upper portion of shaft 12 as viewed in FIG. 1, a pre-heating and pre-reducing zone is generally indicated by reference numeral 18. Below pre-heating and pre-reducing zone 18 is a reducing zone generally indicated by reference numeral 20. A transition zone 22 is defined below reducing zone 20, and a discharge zone 24 is provided generally below transition zone 22. As shown in FIG. 1, a portion of transition zone 22 and discharge zone 24 are defined by conical member 42 and structure 25 defines a remaining portion of discharge zone 24.

Oxide flow within shaft 12 during treatment thereof is in a generally downward direction indicated by arrow A in FIG.

1. Thus, pre-heating and pre-reducing zone 18 is positioned downstream of inlet 14 so as to receive oxides to be treated. Reducing zone 20 is downstream of pre-heating and pre-reducing zone 18, while transition zone 22 is downstream of reducing zone 20 and discharge zone 24 is downstream of transition zone 22.

In further accordance with the invention, a substantially ring shaped member 26 is positioned around at least a portion of shaft 12 so as to define a reforming zone 28 between the inner wall of ring member 26 and the outer wall of shaft 12. A gas inlet 30 is positioned communicating with reforming zone 28, and passes through a portion of the wall of ring member 26. Ring member 26 may suitably be provided as a separate member fastened to the outer surface of shaft 12, or may alternatively be an integral portion of shaft 12. As shown, ring member 26 preferably has arm portions 27 extending to shaft 12 to define upper and lower limits of reforming zone 28.

Passages 32 are provided, according to the invention, preferably arranged in the wall of shaft 12 as shown so as to communicate reforming zone 28 with reducing zone 20. Passages 32 allow the flow of reformed gas from reforming zone 28 into reducing zone 20 for treatment of material therein, as desired.

In accordance with the invention, and advantageously, reducing gas to be used in treating oxides in reducing zone 20 is produced in reforming zone 28 immediately prior to introduction into reducing zone 20 through passages 32. In this regard, a catalyst material 34 is preferably positioned along the walls of ring member 26 and shaft 12 defining reforming zone 28 for inducing the desired reforming of gases introduced through inlet 30. Catalyst material 34 may also be provided in at least a portion of inlet 30 and passages 32 as shown so as to increase contact of the gases with catalyst material 34.

In accordance with the invention, gases to be reformed are typically a mixture of gases high in methane and/or natural gas referred to herein as methane-containing gas, as well as an oxygen source. Such feed materials, when contacted with catalyst material 34 at desired temperatures, result in the production of reformed reducing gases rich in hydrogen and carbon monoxide which are introduced into reducing zone 20 through passages 32 as desired in accordance with the invention.

Still referring to FIG. 1, it is preferred that at least a portion 36 of shaft 12 which forms the inner wall of reforming zone 28 and separates reforming zone 28 from reducing zone 20 be made of a refractory material, which serves to enhance the desired operation of furnace 10 at the desired direct reduction temperatures.

In further accordance with the invention, catalyst material 34 is preferably any catalyst, especially a metal catalyst, which enhances or induces the desired gas reformation reaction. A nickel catalyst material has been found according to the invention to be particularly effective in enhancing the desired gas reformation reaction.

Catalyst material 34 may suitably be provided along the wall surfaces of reforming zone 28 in a number of different ways. In accordance with a preferred embodiment, ceramic inserts are provided or attached to the wall surfaces of reforming zone 28, and catalyst material 34 may suitably be supported, impregnated or otherwise disposed upon the ceramic inserts. Most preferably, the ceramic inserts upon which catalyst material 34 are supported are removable and replaceable with respect to reforming zone 28 so that spent catalyst can readily be replaced without significant interruption in the direct reduction procedure. Of course, catalyst material 34 could be supported directly on the walls defining zone 28 or in numerous other ways if desired.

In further accordance with the invention, passages 32 are preferably provided connecting reforming zone 28 with reducing zone 20 such that passages 32 are arranged at an angle ($\psi$) with respect to the direction of flow of oxides within shafts 12 of at least about 120°, preferably between about 120° to about 150°, and most preferably at an angle of about 135°. Referring to FIG. 1, this angle ($\psi$) is illustrated and drawn between a center line of passage 32 and the inner side wall 38 of shaft 12. This orientation of passage 32 is advantageous in avoiding excessive pressure from oxides and/or reduced metal products flowing within shaft 12 upon surfaces defining passage 32, and serves to thereby provide for the efficient introduction of hot reformed gases to reducing zone 20 as desired. As shown in FIG. 1, passages 32 lead through openings 40 into reducing zone 20, a plurality of which are shown in the drawing spaced around the perimeter of shaft 12.

Still further according to the invention, it has been found that providing a relatively large inner specific surface area of reforming zone 28 is desirable in providing efficient and substantially complete reformation of methane and/or natural gas in reforming zone 28. This advantageously serves to ensure good contact between methane gases to be reformed and the reformation catalyst and has been found to provide reformation rates of 80% of starting methane at the exit from reforming zone 28. The provision of a plurality of passages 32 as well as the upward extension of reforming zone 28 in a substantially annular shape around shaft 12 serves advantageously to enhance and increase the surface area of reforming zone 28 as desired in accordance with the invention. Further, the surface of catalyst material 34 may preferably be roughened so as to further enhance the surface area of zone 28.

It should be readily apparent that the provision of reforming zone 28 serves to advantageously eliminate the need for separate reformation reactors, and also serves to provide an efficient means for reforming natural gases as desired so as to provide hot reduction gases immediately to reducing zone 20.

Still referring to FIG. 1, and as referred to above, transition zone 22 is preferably defined by a substantially conical-shaped member 42 having an inside diameter which decreases in size from an inlet end 44 which receives reduced oxides from reducing zone 20 to an outlet end 46 which conveys reduced oxides to discharge zone 24 which may be defined by bottom structure 25, shown schematically in the drawings as a substantially cylindrical cap member having a generally horizontal outlet.

In accordance with the invention, conical member 42 preferably slopes inwardly from inlet end 44 to outlet end 46 at an angle $\beta$ of between about 8° to about 12°. This is desirable so as to maintain the plug flow of solids within shaft 12 toward discharge zone 24 of structure 25 as desired. From transition zone 22, reduced oxides are conveyed to discharge zone 24 where a magnetic valve 48 is preferably positioned for controlling the discharge of reduced or metallized product from discharge zone 24 as desired.

In accordance with the invention, certain temperatures are preferably maintained within shaft furnace 10 so as to induce and enhance the desired reactions within the various zones. In this regard, the temperature within pre-heating and pre-reducing zone 18 is preferably maintained at a temperature of between about ambient to about 760° C. The temperature in reducing zone 20 is preferably maintained between about 760° C. to about 960° C. so as to ensure the proper reduction reaction therein. Transition zone 22 is provided for at least partial cooling of the reduced metallized product from reducing zone 20, preferably using cooling gas as will be discussed below, so as to reduce the temperature of the reduced metallized product to a desired level depending upon the next step to be performed upon the reduced product.

In this regard, reduced final product can be maintained at a relatively high temperature and formed into briquettes and other shapes, if desired, or can be substantially cooled for cold discharge from furnace 10. Cooling of the reduced final product according to the invention serves to help prevent re-oxidation of the reduced final product. According to the invention, therefore, cooling gas is preferably injected into transition zone 22 so as to cool the hot reduced metallized product from reducing zone 20 to a temperature of less than or equal to about 760° C., preferably less than about 650° C., for briquetting purposes, and to a temperature preferably less than or equal to about 55° C. for cold discharge.

Figure 3:
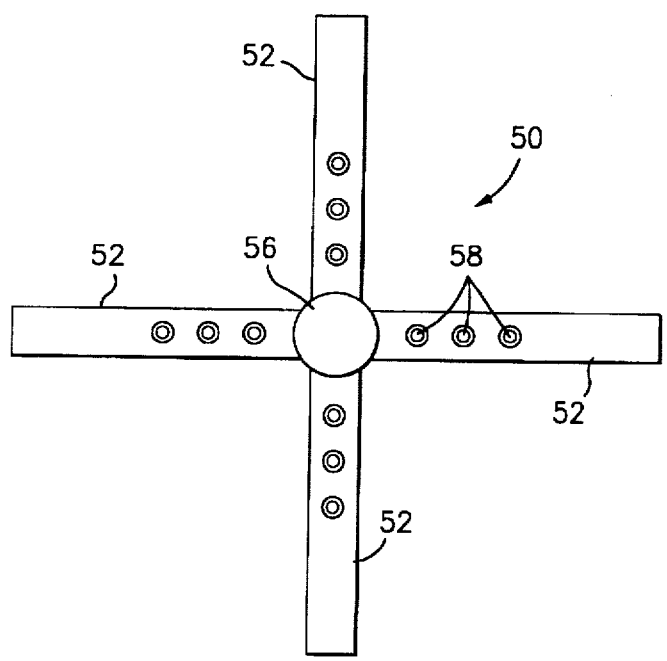
FIG. 3 shows a cooling gas inlet member in accordance with the invention.

Referring to FIGS. 1 and 3, furnace 10 preferably includes a cooling gas injection member 50 preferably provided within transition zone 22 for use in injecting cooling gas into direct contact with hot reduced product within transition zone 22. FIG. 1 shows a side schematic view of cooling gas injection member 50 having a plurality of hollow shafts 52, each having inlet ends 54 and being joined at a hub 56 substantially centrally located within transition zone 22. As shown in the drawing, hollow shafts 52 preferably each include a plurality of nozzles 58, preferably positioned on the downstream side 60 of hollow shafts 52, so that cooling gas is injected into transition zone 22 from the downstream side of hollow shafts 52. Referring to FIG. 3, a bottom view of cooling gas injection member 50 is provided and shows four hollow shafts 52 connected at a single hub member 56, wherein each shaft 52 has three nozzles 58 positioned on bottom or downstream wall portions thereof.

Returning to FIG. 1, it is also preferable that each hollow shaft 52 be positioned so as to angle or slope away from hub 56 in the direction of flow of solids within shaft 12 as shown. This further advantageously serves to structurally reinforce cooling gas injection member 50 against pressure and the impact of solids flowing downwardly in the direction of arrow A within shaft 12.

In further accordance with this alternative embodiment of the invention, inlet end 44 of conical member 42 is preferably larger in diameter than outlet end 62 of shaft 12. Furthermore, inner surface 64 of outlet end 62 may preferably be outwardly beveled as shown in FIG. 1 so as to provide a beveled inner surface 66 arranged at an angle $\alpha$ with respect to inner surface 64 which angle $\alpha$ may suitably be, for example, between about 10° to about 60° in accordance with the invention. This advantageously serves to define an open collection area generally indicated at 68 in which cooling gas can collect after passing through the solid material within transition zone 22. According to the invention, outlets 70 may be provided, preferably communicating with open area 68, for outlet of cooling gas from transition zone 22 in accordance with the invention.

Still referring to FIG. 1, the operation of furnace 10 according to the invention will be further described. Oxides such as iron oxides and the like are fed to furnace 10 through oxides inlet 14. In the meantime, a mixture of gases preferably including natural gas and/or methane-containing gases, and oxidants such as air, oxygen, carbon dioxide, steam or mixtures thereof are introduced to inlet 30, preferably at a temperature of between about 1,000° C. to about 1,150° C. Through contact with catalyst material 34 in reforming zone 28, a hot reducing gas is produced, preferably having the following composition: 12.7–40.9% CO; 31–51.1% $H_2$; 1.5–29.85% $CO_2$; and 6.42–29.1% $CH_4$. Reducing gases formed in reforming zone 28 pass through passages 32 into reducing zone 20, wherein contact with oxides at desired temperatures results in the direct reduction of the iron oxides. The reducing gas flows upwardly through reducing zone 20 and pre-heating and pre-reducing zone 18 to exit from gas outlet 16, where gas may be recirculated and recycled if desired.

A hot reduced product is formed in reducing zone 20 and passes from reducing zone 20 to transition zone 22 to collect in discharge zone 24 for eventual release, preferably using magnetic valve 48. Depending upon the next processing step after discharge zone 24, reduced product within transition zone 22 may be cooled, if desired, by introducing a cooling gas through injection member 50 as set forth above. Cooling gas enters transition zone 22 through nozzles 58, and flows initially downwardly and then upwardly through material in transition zone 22 to outlets 70 in the upper portion of transition zone 22. Of course, a portion of the cooling gas also flows upwardly through reducing zone 20 and pre-heating and pre-reducing zone 18 to exit from gas outlet 16 along with spent reducing gas. As set forth above, cooling gas is used to cool the hot educed product to a temperature sufficiently low to avoid re-oxidation thereof. The temperature and quantity of cooling gas to be injected may suitably be selected to provide the desired discharge temperature of final reduced product.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A shaft furnace for the reduction of oxides, comprising:
   shaft means having wall means defining an oxide inlet, a pre-heating and pre-reducing zone downstream of said oxide inlet, a reducing zone downstream of said pre-heating and pre-reducing zone, a transition zone downstream of said reducing zone, and a discharge zone downstream of said transition zone;
   an annular gas reforming zone within said wall means, said annular gas reforming zone having an internal surface, said internal surface having a catalyst thereon for reforming a methane-containing gas into a reformed gas in said annular gas reforming zone; and
   passage means for communicating said reformed gas in said reforming zone with said reducing zone whereby oxides in said reducing zone are reduced by said reformed gas.

2. A shaft furnace according to claim 1, including means for introducing a methane-containing gas into said gas reforming zone.

3. A shaft furnace according to claim 1, wherein said catalyst is a nickel catalyst.

4. A shaft furnace according to claim 1, wherein said wall means includes a substantially ring shaped member to define said annular reforming zone therebetween.

5. A shaft furnace according to claim 1, wherein said gas reforming zone comprises a substantially ring shaped member disposed around said shaft means so as to define said annular reforming zone therebetween, inlet means for introducing a methane-containing gas into said annular reforming zone so as to produce a reformed gas.

6. A shaft furnace according to claim 7, wherein said ring shaped member has an inner wall and said shaft means has an outer wall which together define said annular reforming zone, and wherein said inner wall and said outer wall support said catalyst whereby surface area of said catalyst exposed to said methane-containing gas is enhanced.

7. A shaft furnace according to claim 5, wherein said passage means comprises at least one passage connecting said reforming zone and said reducing zone, and wherein said at least one passage is arranged at an angle ($\psi$) with respect to a direction of flow of oxides in said reducing zone of at least about 120°.

8. A shaft furnace according to claim 7, wherein said angle ($\psi$) is between about 120° to about 150°.

9. A shaft furnace according to claim 7, wherein said angle ($\psi$) is about 135°.

10. A shaft furnace according to claim 1, wherein said shaft means comprises a substantially cylindrical member defining said reducing zone and having an outlet end from said reducing zone for conveying oxides to said transition zone, said outlet end having an inner diameter, and wherein said shaft means further comprises a substantially conical-shaped member defining said transition zone and having an inner diameter decreasing in size in a direction of flow of oxides in said transition zone from an inlet diameter at an inlet end for receiving oxides from said reducing zone which is larger than said inner diameter of said outlet end of said reducing zone, to an outlet diameter at a transition zone outlet end for conveying oxides to said discharge zone which is smaller than said inner diameter of said outlet end of said reducing zone, wherein said inlet end of said transition zone and said outlet end of said reducing zone define a collection area for collecting cooling gas, and further comprising means for introducing cooling gas into said transition zone, and cooling gas outlet means communicated with said collection area.

11. A shaft furnace according to claim 10, wherein said conical member has an inner wall surface and a central axis and wherein said inner wall surface slopes inwardly toward said outlet end at an angle ($\beta$) of between about 8° to about 12° with respect to said central axis.

12. A shaft furnace according to claim 10, wherein said means for introducing cooling gas comprises at least one hollow shaft positioned in said transition zone and having at least one inlet for introducing cooling gas to said hollow shaft and at least one cooling gas nozzle positioned on a downstream portion of said hollow shaft for conveying said cooling gas from said hollow shaft to said transition zone.

13. A shaft furnace according to claim 12, further comprising a plurality of hollow shafts radially positioned within said transition zone and joined at a centrally located hub, and wherein said plurality of hollow shafts are angled so as to slope away from said centrally located hub in said direction of flow of oxides.

14. A shaft furnace according to claim 1, further comprising exhaust gas outlet means associated with said pre-heating and pre-reducing zone for removing spent gas from said shaft means.

* * * * *

UNITED STATES PATENT AND TRADEMARK OFFICE
CERTIFICATE OF CORRECTION

PATENT NO. : 5,702,246
DATED : December 30, 1997
INVENTOR(S) : Oscar G. Dam

It is certified that error appears in the above-identified patent and that said Letters Patent is hereby corrected as shown below:

In claim 6 the dependency should be changed from "7" to --5--.

Signed and Sealed this

Eighth Day of September, 1998

Attest:

BRUCE LEHMAN

Attesting Officer         Commissioner of Patents and Trademarks